United States Patent [19]

Buzzelli

[11] 4,383,015
[45] May 10, 1983

[54] IRON-SILVER BATTERY HAVING A SHUNT ELECTRODE

[75] Inventor: Edward S. Buzzelli, Export, Pa.

[73] Assignee: Westinghouse Electric Corp., Pittsburgh, Pa.

[21] Appl. No.: 338,459

[22] Filed: Jan. 8, 1982

[51] Int. Cl.³ .................................................. H01M 6/04
[52] U.S. Cl. .................................. 429/206; 429/219; 429/221
[58] Field of Search .................. 429/206, 58, 59, 60, 429/219, 221

[56] References Cited

U.S. PATENT DOCUMENTS

| | | | |
|---|---|---|---|
| 3,132,053 | 5/1964 | Keebs | 429/206 X |
| 3,754,998 | 8/1973 | Hamlen et al. | 429/219 X |
| 4,056,660 | 11/1977 | Rampel et al. | 429/206 X |
| 4,078,125 | 3/1978 | Brown | 429/219 X |
| 4,113,924 | 9/1978 | Kantner | 429/58 X |
| 4,145,482 | 3/1979 | von Benda | 429/206 X |

Primary Examiner—Charles F. Lefevour
Attorney, Agent, or Firm—D. P. Cillo

[57] ABSTRACT

An iron-silver battery is made, comprising at least one positive silver electrode plate; at least one negative iron electrode plate; and at least one shunt electrode connected to and electrically in parallel with the positive plate comprising a material having a lower oxygen evolution potential than silver, each separated from the other by a material that is not chemically attacked by electrolyte solution, and all housed in a case containing an electrolyte solution.

10 Claims, 3 Drawing Figures

IRON-SILVER BATTERY HAVING A SHUNT ELECTRODE

BACKGROUND OF THE INVENTION

Iron-silver batteries are well known in the art, and taught by Brown in U.S. Pat. No. 4,078,125. These batteries, while displaying outstanding high energy densities, have their own unique problems. In the typical zinc-silver cell, the negative zinc electrode is the life limiting component, but in the iron-silver cell, the positive silver electrode which has a solubility problem is the primary life limiting component.

Silver electrodes have a limited solubility in KOH electrolyte, and are most soluble near the end of charge when the highest positive electrode potentials are achieved. This limited solubility results in the transference of metallic silver to the other parts of the cell, such as the separators and anode. The result of this silver solubility can be eventual cell failure due to excessive leakage current, or an internal short circuit.

Iron-silver batteries, using negative electrodes made from fiber metal current collectors and $Fe_3O_4$ pasted active material, also require an extended "formation" period, requiring several charge-discharge cycles before full design capacity is achieved, and upon extended cycling, some shedding of the active material from the iron electrode may occur.

SUMMARY OF THE INVENTION

The problems identified hereinabove have been overcome by utilizing a shunt third electrode, which is electronically connected to the silver electrodes and is ionically a positive electrode, and by preferably utilizing an iron electrode which comprises substantially pure metallic iron particles, and contains no activators, such as sulfur.

The shunt electrode is selected from a material having a lower oxygen evolution potential than silver, and this prevents the silver electrode from reaching the high positive voltages where its solubility in KOH is greatest. This, in turn, should significantly reduce the silver solubility and increase the service life of the battery.

The improved negative iron electrode is made by thermally reducing $Fe_2O_3$ powder at between 400° C. and 1,000° C. in a reducing atmosphere, and final pressing and sintering with an optional, expanded metal current collector, in a reducing atmosphere, at between 700° C. and 1,000° C. Since this negative electrode is sintered 100% active material having high structural integrity, no shedding of the active material will occur upon extended cycling.

A plurality of iron electrodes are used in conjunction with a plurality of substantially pure silver electrodes and at least one shunt electrode having a lower oxygen evolution potential than silver, preferably nickel, iron, or nickel plated iron. The electrodes are disposed in a suitable case containing an electrolyte solution comprising, for example, KOH, and are separated using a separator system that is resistant to chemical attack by hydroxyl or other ions contained in the electrolyte solution. These batteries have a very long useful electrochemical lifetime and provide energy density values of between about 34 to 50 watt-hours/pound and about 2.5 to 3.0 watt-hours/cubic inch of cell, at a 3 hour discharge rate, depending on design, for at least 50 to 500 cycles.

BRIEF DESCRIPTION OF THE DRAWINGS

For a better understanding of the invention, reference may be made to the exemplary embodiments shown in the accompanying Drawings, in which.

DESCRIPTION OF THE PREFERRED EMBODIMENTS

Figure 1:
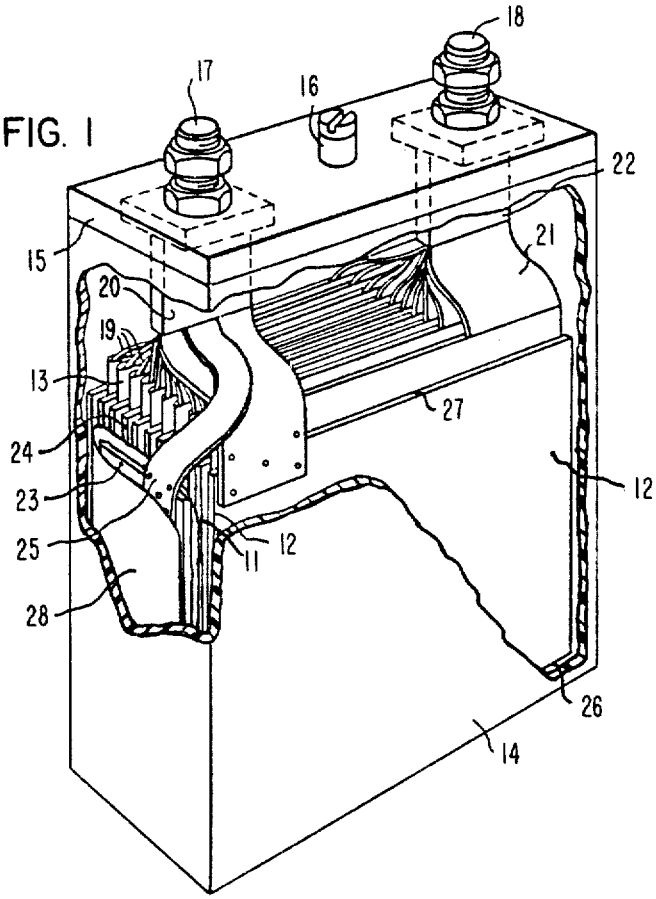
FIG. 1 shows a perspective view of one embodiment of the iron-silver, high performance battery cell of this invention.

FIG. 1 of the Drawings shows one embodiment of the Fe-Ag battery cell of this invention, with the plurality of negative, sintered Fe particle electrode plates 11, a plurality of positive Ag electrode plates 12, and plate separators 13 between the positive and negative plates, all housed in case 14, having cover 15, vent 16, positive terminal 17, and negative terminal 18. Positive lead tabs 19 are shown attached to intercell connection lug 20 and negative lead tabs 21, disposed 180° away from the positive tabs, are shown attached to intercell connection lug 22. These lead tabs provide means for making electrical connections to the respective plates.

The shunt third electrode 23 is shown in its preferred position in the case, disposed next to the sides 24 of and perpendicular to the positive and negative plates, with its own positive lead tab 25 shown attached to intercell connection lug 20. The shunt electrode can also be disposed next to the bottoms 26 or tops 27 of and perpendicular to the positive and negative plates, or parallel to the positive and negative plates. Usually, only one shunt electrode will be needed per battery, but two or more could be utilized. The shunt electrode's wrap-around separator 28 is also shown.

In the battery of this invention, an electrolyte, comprising, for example, a 10 wt.% to 50 wt.% aqueous alkali hydroxide, such as KOH solution, which may or may not contain additional additives, will contact the electrode plates, shunt electrode and separators within the case. The plate separators, which are preferably of a multiply construction of porous and microporous sheets of polypropylene, are generally shown at 13, not surrounding the plates for clarity of illustration. The plates preferably slide into the separators, which are of an envelope type construction having the porous ply contacting the plates. The separator 28 is of the same construction as separators 13.

The positive plates can be made of a silver or a silver plated metal support, generally a thin perforated silver sheet, or an expanded silver screen, mesh, net or strand structure, into which, preferably, substantially pure, i.e., about 98% pure silver metal particles, preferably in powder form, are applied generally by a roll compacting method. The loaded supporting plaque is then heat sintered, to form a substantially pure silver anode of between 50% to 85% porosity. Some minor amount of silver may oxidize during this process but no silver oxide as such is added deliberately.

The negative plates are preferably made of sintered metallic iron, where the active, metallic, elemental iron itself constitutes the entire electrode structure. This electrode does not contain any sulfur or sulfate activators. The active battery material comprises substantially pure iron particles. This material can be easily produced from ferric oxide (Fe$_2$O$_3$), which is an inexpensive, commercially available material. The Fe$_2$O$_3$ can be thermally reduced to metallic iron, Fe, at between about 400° C. and about 1,000° C., in a reducing atmosphere, preferably H$_2$, for about 15 minutes to about 600 minutes. It can then be ground or otherwise pulverized to a generally spherical particulate powder having an average particle size of between about 10 microns and about 275 microns diameter. Over 275 microns diameter and problems may be encountered in later reduction and sintering steps. The term "diameter" is herein meant to also include irregular shaped particles.

The sized iron is pressed by a suitable pressing means, such as flat bed press, to provide a plaque structure that can be handled. The structure is then sintered at between about 700° C. and about 1,000° C., in a reducing atmosphere, preferably H$_2$, for about 15 minutes. The particles sinter at their contact points to provide an interconnected, contacting, generally spherical agglomerate, sponge-like, metallic structure of iron.

This electrode structure can advantageously be made very thin, i.e., from about 25 mil to about 150 mil. It will have a density of about 1.8 g./cu. cm. to about 3.0 g./cu. cm., a porosity of between about 45% and about 90% and high structural integrity. The porous, bonded particle structure contains 100 percent active material and need not have a support structure, although a nickel, or nickel coated or uncoated iron expanded metal grid, or other type current collector can be incorporated into the electrode. The current collector is, however, advantageous to prevent surface densification. This type of electrode can eliminate the use of weighty supports and the need of intricate and time consuming plaque pasting or other plaque loading techniques.

This electrode will not shed active material, and is capable of immediate discharge, providing an output of up to about 0.50 Ah/g. of active material-structure. This electrode eliminates the need for repeated charge-discharge cycling prior to use, and eliminates the need for any activation dipping or spraying steps, and provides a very simple, inexpensive, high output iron electrode.

The iron (negative) plates and silver (positive) plates are alternatively stacked, caustic resistance separators placed between adjacent plates to form cells, and then the cells are assembled and the shunt electrode properly positioned, to make a long life Fe-Ag battery.

Figure 2:
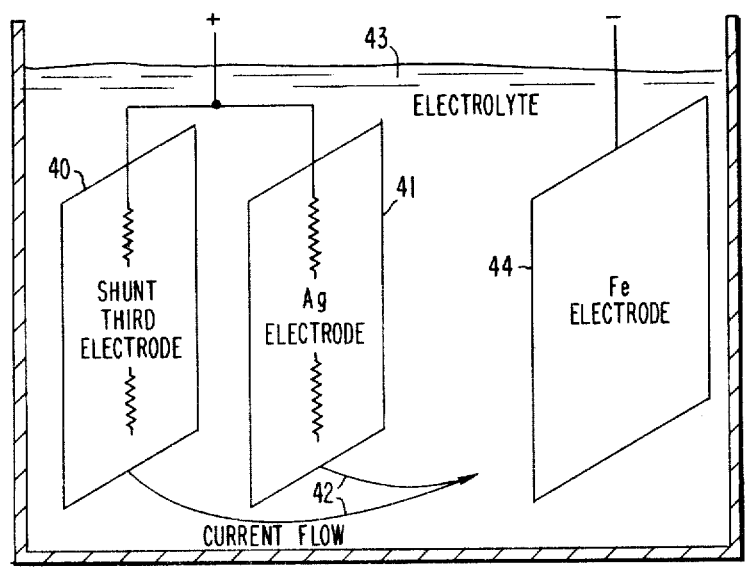
FIG. 2 shows an electrical description of the shunt third electrode of this invention.

The shunt electrode is incorporated into the battery to limit the amount of current passing through the positive silver electrode, to prevent the silver electrode from reaching an overly high voltage, yet providing enough current at the appropriate voltage to maintain full capacity. In use, the shunt electrode is a material electronically connected to the silver electrode to act as the electrical analog of a shunt. In terms of this electrical analog, and referring to FIG. 2 of the Drawings, the shunt electrode 40 acts as a dependent, variable voltage resistor connected to and electrically in parallel with the silver electrode 41, which is also acting as a resistor. The amount of current which flows through each electrode is equivalent to the electrical analogy of a parallel resistance network. Current, shown as 42, then flows through the electrolyte 43 to the negative iron electrode 44 in the charging mode.

Figure 3:
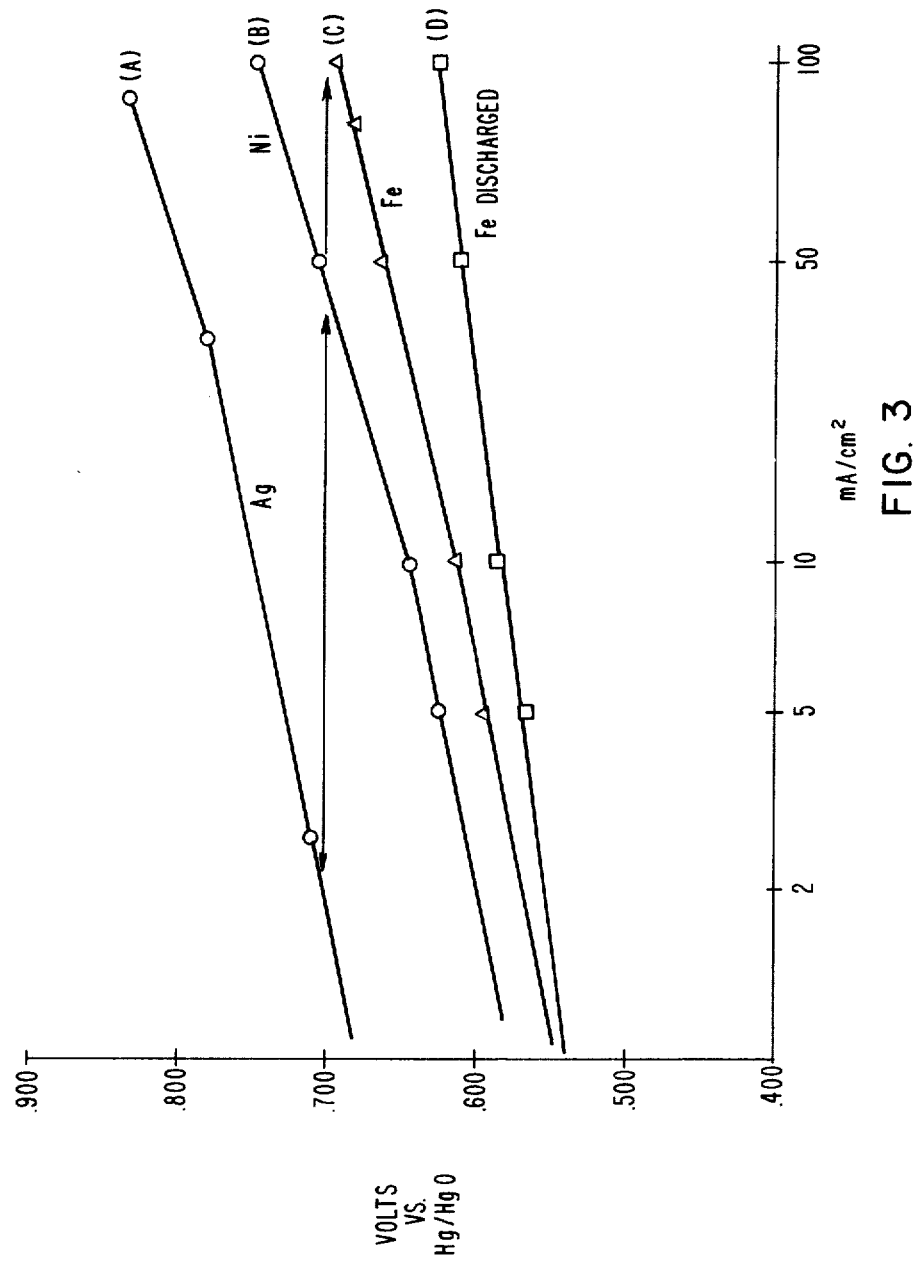
FIG. 3 shows the overvoltage characteristics of materials as the shunt electrode of this invention.

Overvoltage measurements were taken for several practical materials, to determine useful shunt electrode candidates. The slopes of overvoltage were determined on approximately 7inch×7inch×0.035 inch plaques of sintered nickel fiber, sintered powdered iron and discharged or oxidized sintered powdered iron. The slopes of the overvoltage were determined experimentally by varying the current density through the material as it was in the oxygen evolution mode in KOH electrolyte, and monitoring its voltage. These curves were then compared to a similarly sized fully charged silver electrode in the oxygen evolution mode, or at full charge. The results of these tests are shown in FIG. 3 of the Drawings. As can be seen, at a constant current density, both nickel and iron have a lower oxygen evolution potential than silver, i.e., at the same current density a higher voltage is required for oxygen evolution for silver as compared to either nickel or iron.

In analyzing the number and size of the shunt electrode plates required per battery, the slopes of FIG. 3 were used. A potential of 0.700 volt vs-Hg/HgO reference electrode was taken as a base. From FIG. 3, it would be expected that the ratio of the current flowing through the iron electrode to that in the silver electrode would be about 50:1. Another analysis of this Figure would conclude that when the ratio of the area of the silver material to the iron material were 50:1, then equal amounts of current would be flowing through each material at 0.700 volt-vs-Hg/HgO, through the current density (mA/cm$^2$), would be 1:50. At this voltage drops, the ratio decreases slightly. As the voltage increases, the ratio increases, so that under a condition of fixed amounts of material the current through the iron electrode would increase more rapidly as the voltage increased, acting as a voltage limiter or a variable resistance current shunt.

In an iron-silver cell there are about 240 total square inches of silver electrode surface. From the previous discussion, it can be concluded that 1/50 of the silver area as a shunt electrode of iron would be adequate to act as a controlling electrode. In order to account for possible intercell resistance problems and other details which have been ignored, a safe silver:shunt electrode area ratio of about 30:1 for the cell design was selected when sintered iron was used. Taking % density of each electrode into account, the preferred ratio of silver electrode surface area multiplied by silver electrode % density:iron electrode surface area multiplied by iron electrode % density, in the shunt electrode, is between about 50 to 15:1. This ratio should be effective through a wide voltage range.

As can be seen from FIG. 3, where curve (A)=Ag, curve (B)=Ni, curve (C)=Fe and curve (D)=Fe discharged, it can also be concluded that 1/25 of the silver area as a shunt electrode of nickel would be adequate to act as a controlling electrode. A safe silver:nickel third shunt electrode ratio would be about 15:1. Taking % density into account, the preferred ratio of silver electrode surface area multiplied by silver electrode % density:nickel electrode surface area multiplied by iron electrode % density in the shunt electrode, is between about 25 to 7.5:1. As can be seen, iron is much preferred as the shunt electrode material. The shunt electrode should have as large a surface area as possible, preferably a porosity over about 75%, i.e., under about 25% of theoretical density, so that a flat sheet structure is not as desirable as a porous sintered powder or sintered fiber structure.

The iron shunt electrode can be made by the same method described above for negative plates, i.e., a sintered, metallic iron, sponge-like structure. For the third shunt electrode, a sintered fibrous structure can also be used, consisting essentially of or iron, low carbon steel wool, nickel plated steel wool, or nickel fibers having diameters between about 0.0002 and 0.005 inch. The fibers can be diffusion bonded together at about 800° C. to about 1,000° C. to provide a very porous structure of high surface area. These examples are not to be considered limiting, and any type of highly porous iron or nickel sheet material can be utilized as the shunt electrode in the battery of this invention.

EXAMPLE 1

An iron-silver battery, similar to that shown in FIG. 1 of the Drawings was constructed. Iron plates were made from commercially available $Fe_2O_3$ powder, having an average particle size of between about 150 to 250 microns diameter. This powder was placed in a nickel tray, thermally reduced at 700° C. in a hydrogen atmosphere to form elemental Fe, and allowed to cool in hydrogen gas. This material was then resized so that the average particle size would pass through a 60 mesh (250 micron) screen.

A number of plates were made. A material comprising the iron particles were placed between two sheets of expanded nickel mesh current collectors, having two nickel coined bars attached on the ends, to establish a high density welding region for lead tabs. This composite was then flat bed press-molded at about 0.625 ton/sq.in. and upwards pressure, to produce two sets of plates. One set had a thickness of about 0.08 inch to 0.09 inch, and the other set had a thickness of about 0.05 inch. After pressing, the plaques were sintered at 800° C. in hydrogen gas, then cooled in hydrogen gas.

The iron particle electrodes produced, contained interconnected, contacting iron active material particles, sintered together without substantial melting. The electrodes had a porous sponge, spherical particle agglomerate form, were structurally firm, and very strong. The electrodes had an active material density of approximately 1.76 to 2.4 g./cu.cm. and a porosity of about 70% to 80% and contained no sulfur type activators. The iron plates were fully reduced and capable of immediate discharge. These plates were cut to 3.5 inch×6.25 inch size, having an active weight of 58 grams each and a total weight of 81 grams, including the nickel coin bars, for the 0.08 inch thick plates, and an active weight of 35 grams each and a total weight of 58 grams, including the nickel coin bars, for the 0.05 inch thick plates.

Silver electrodes 3.375 inch×6 inch×0.048 inch, each weighing about 75 grams and having a porosity of about 60%, i.e., 40% of theoretical density, were used as the positive electrodes. These plates consisted of essentially pure silver powder particles, roller pressed into a silver mesh screen support plaque.

A sintered, iron powder shunt electrode was then made. The apparent total surface area of the silver electrodes was about 20 sq. in. per side×2 sides×6 electrodes used per battery stack up=about 240 sq. in., not taking electrode porosity into account. Using a silver:shunt electrode area ratio for iron powder of 30:1, it was calculated that 8 sq. in. of total third electrode surface area would be needed to control silver solubility in the electrolyte, i.e., 4 sq. in. per side. However, the iron electrode is more porous, so to be on the safe side, the shunt electrode dimensions were finalized at 5.75 inch×1.2 inch×0.050 inch. This provided a % density corrected silver:iron ratio of about 26:1, i.e., 240 sq. in. total×40% density for the silver electrodes:6.9 sq. in.×2 sides×20% density for the iron electrode. The shunt electrode was made the same way as the iron plates, described above, starting with 150 to 250 micron diameter $Fe_2O_3$, reducing at 700° C. in hydrogen, sizing, etc. Porosity was 80%, i.e., 20% of theoretical density.

The iron and silver electrodes had lead tabs, respectively of nickel and silver, attached and were stacked, with the negative lead tabs disposed 180° away from the positive tabs. The battery, as shown in FIG. 1 of the Drawings, consisted of five inside bagged iron electrodes 0.08 inch thick and two outside bagged iron electrodes 0.05 inch thick alternating with six silver electrodes. The electrodes were insulated from each other by bags of polypropylene laminate separator material. The multiply separators consisted of three alternating layers of 1 mil (0.001 inch) microporous polypropylene sheet, with pores about 0.1 micron to about 2 microns average diameter, and four alternating layers of 6 mil, coarse, non-woven 80% porous polypropylene sheet with pores about 4 microns to about 30 microns average diameter.

The stack up of multiply separated iron and silver electrodes was placed in a ¼ inch thick plexiglass battery case, having dimensions of 3.75 inch×1.250 inch×9.00 inch. The lead tabs were trimmed to extend ½ inch through the top of the case for ease of battery terminal connection, and to allow a 3/16 inch electrolyte reservoir at the bottom of the case.

The sintered, high surface area, iron powder shunt electrode had a nickel lead tab attached and was then placed in a polypropylene laminate separator bag, similar to those described above, and inserted into the battery case so that it was disposed next to the sides of and perpendicular to the positive and negative plates, as shown in FIG. 1 of the Drawings.

All of the lead tabs were attached to their respective intercell connection lugs, as shown in FIG. 1 of the Drawings, with the shunt electrode attached to the positive terminal along with the silver electrode. Thus, the shunt electrode will act to limit the amount of current passing through the silver electrode, acting as the electrical analog of a shunt. Then, the case was sealed at the top with epoxy resin, vacuum tested and vacuum filled with electrolyte. The electrolyte comprised 366 ml. of 25 wt.% aqueous KOH. The total weight of the battery was about 1,750 grams (3.86 lbs.).

The assembled battery was then bench tested through a series of 8 hour to 20 hour duration charge, test cycles, at various discharge rates to establish the capacity and energy density rating. A 25 amp to 50 amp drain rate was used to a cut-off voltage of 0.9 volts. The results are given below in Table 1:

TABLE 1

| Charge | Drain Rate | Amp-Hrs. | Watt-Hrs. | Watt-Hrs. Per Pound |
|---|---|---|---|---|
| 25 × 8 hrs. | 50 amp. | 117 | 123 | 34.0 |
| 25 × 8 hrs. | 30 amp. | 125 | 136 | 37.4 |
| 25 × 8 hrs. | 20 amp. | 127 | 138 | 37.8 |
| 12 × 17 hrs. | 30 amp. | 134 | 144 | 39.4 |

These capacity and energy density values show that this battery system provides high performance and long life with outstanding voltage characteristics, high charge acceptance high storage capacity per unit weight and long life with stable performance characteristics. No cyclic formation is required.

The battery can be charged at a wide variety of rates from about a 4 hour rate to about a 20 hour rate or greater, with nearly constant capacity. This battery also exhibits high charge acceptance, i.e., greater than 90% for extended cycles without loss in capacity. Other beneficial characteristics are the ability to sustain cell reversal without loss in capacity, wide thermal operating limits of 0° C. to 95° C., low shelf discharge, i.e. less than 1% per day, and the ability to be float charged for over 30 days.

Third electrode cells operated at a 500 hr. float cycle had voltage ranges of from about 1.48 initially, up to 1.69, whereas cells not having third electrodes had voltage ranges of from about 1.49 initially, up to 2.10. The third electrode effect is demonstrated by the end of float charge voltage, i.e., 1.69 with vs. 2.10 without the third electrode. An exactly similar battery has been tested at a 3 hour discharge rate for 100 cycles, with a cut-off voltage of 0.9 volts, and exhibited an energy storage density of about 40 watt-hours/pound and 2.5 watt-hours/cubic inch of cell.

This battery can be built in various sizes and shapes, simply by changing the dimensions of the individual electrodes, depending on the mission and battery system for which it is intended. This battery is extremely stable and reliable, having wide operational temperature limits, and would be particularly useful in underseas and space environments.

I claim:

1. An iron-silver battery comprising a case within which are disposed:
    (1) at least one positive electrode plate comprising:
        (a) a porous plaque comprising silver active electrode material,
        (b) an electrical lead tab attached to the electrode,
    (2) at least one negative electrode plate comprising:
        (a) a porous, electrode structure comprising iron active material,
        (b) an electrical lead tab attached to the electrode,
    (3) at least one shunt electrode connected to and electrically in parallel with the positive electrode plate comprising:
        (a) a porous structure comprising a material having a lower oxygen evolution potential than silver,
        (b) an electrical lead tab attached to the shunt electrode,
    (4) a separator between the positive and negative plates and between the plates and the shunt electrode;
    (5) an electrolyte solution; and
    (6) means for making electrical connections to the plates in a manner such that the positive plate and the shunt electrode are connected to a positive terminal, and the negative plate is connected to a negative terminal.

2. The battery of claim 1, wherein the shunt electrode comprises a material selected from the group consisting of iron, nickel and nickel plated iron, has a high surface area, and has a porosity of over about 75%.

3. The battery of claim 1, wherein the shunt electrode consists essentially of particles of elemental iron and the area ratio of silver electrode surface area multiplied by silver electrode % density:iron electrode surface area multiplied by iron electrode % density is between about 50 to 15:1.

4. The battery of claim 1, where on charge operation, the shunt electrode is effective to limit the amount of current passing through the positive silver electrode to lower silver metal loss into the electrolyte solution.

5. The battery of claim 1, where the shunt electrode is disposed next to the sides of and perpendicular to the positive and negative plates.

6. The battery of claim 1, wherein the negative electrode is about 25 mil to about 150 mil thick, about 45% to about 90% porous, contains a metal grid current collector, is fully activated, and the iron active material consists essentially of sintered, interconnected, contacting particles of elemental Fe produced by thermal reduction of $Fe_2O_3$.

7. The battery of claim 1, wherein the lead tabs on the positive and negative plates are turned 180° from each other, each positive tab being connected to a positive terminal and each negative tab being connected to a negative terminal, said terminals extending through the cover.

8. The battery of claim 1, wherein the electrolyte comprises a 20 wt.% to 35 wt.% aqueous solution comprising alkali hydroxide, and the separators are a multiply polypropylene material that is resistant to chemical attack by the electrolyte or ions contained in the electrolyte.

9. The battery of claim 1, wherein the silver active electrode material consists of at least 98% pure silver, supported by a porous silver plaque.

10. The battery of claim 9, wherein the positive silver supporting plaque consists essentially of a silver mesh.

* * * * *